L. JOHNSON.
AX HANDLE LATHE.
APPLICATION FILED MAY 22, 1913.

1,091,455.

Patented Mar. 24, 1914.

WITNESSES:

INVENTOR.
Lorenzo Johnson
BY
ATTORNEY.

L. JOHNSON.
AX HANDLE LATHE.
APPLICATION FILED MAY 22, 1913.

1,091,455.

Patented Mar. 24, 1914.
6 SHEETS—SHEET 3.

WITNESSES:
J. S. Leake
F. H. Kappa

INVENTOR.
Lorenzo Johnson
BY
ATTORNEY.

L. JOHNSON.
AX HANDLE LATHE.
APPLICATION FILED MAY 22, 1913.

1,091,455.

Patented Mar. 24, 1914.

WITNESSES:
INVENTOR.
Lorenzo Johnson
BY
ATTORNEY.

UNITED STATES PATENT OFFICE.

LORENZO JOHNSON, OF LOUISVILLE, KENTUCKY, ASSIGNOR OF ONE-HALF TO OSCAR HAUENSTEIN, OF LOUISVILLE, KENTUCKY.

AX-HANDLE LATHE.

1,091,455.     Specification of Letters Patent.     Patented Mar. 24, 1914.

Application filed May 22, 1913. Serial No. 769,165.

*To all whom it may concern:*

Be it known that I, LORENZO JOHNSON, a citizen of the United States, residing at Louisville, in the county of Jefferson and State of Kentucky, have invented new and useful Improvements in Ax-Handle Lathes, of which the following is a specification.

This invention relates to ax-handle lathes, and more especially to that class used for shaping the "pod," that is the end that enters the eye of the ax.

An object is the provision of a machine that may be readily manipulated for the rapid and accurate sizing of the pods of handles.

With foregoing and other objects in view the invention consists of the novel construction set forth, and illustrated in the accompanying drawings which form a part of this specification, in which is set forth an embodiment of the invention, but it is to be understood that changes, variations and modifications may be resorted to that come within the scope of the claims appended hereunto.

In the drawings, in which like reference characters indicate like parts in the different views.

The main frame of the machine comprises upright end pieces —1— connected by suitable longitudinal rails 2, 2' and 2". On the top of the main frame a shaft —3— mounted in suitable bearings —4— carries a driving pulley —5—, and a suitable cutter-head —6—. On a lower portion of the main frame bearings —7—7—, arranged to be adjusted in and out through the medium of screw threaded rods —8—8— operated by handles —9—9—, are provided for the reception of a swinging frame —10—. The swinging frame comprises a shaft —11— on which is secured a tail stock —12—, a head stock —13— and a chuck stock —14— located intermediate the length of the shaft between the head and tail stocks. A spindle —15—, slidably mounted in the tail stock, is provided on its forward end with a revoluble face plate —16— having anti friction bearings —17—. The spindle 15 is held in a retracted position by means of a spring —18—, and may be advanced through the medium of a depending stem —19—, connecting rod —20—, sliding sleeve —21—, lever —22—, fulcrumed on the rail 2', and having a bifurcation adapted to bear against the rear end of the sleeve 21, connecting rod —23— and foot lever —24—. A spindle —25—, suitably mounted in the head stock, and adapted to be adjusted longitudinally, by means of a lever —26— and rack —27—, is provided on its inner end with spurs —28— on which the work may be impaled, and on the outer end with a handle —29— by means of which the work may be rotated and all sides presented to the action of the cutter head 6. A cam —30— secured on the spindle 25 is adapted to bear against a cam-plate —31—, adjustably secured on the main frame, and serves to regulate the position of the swinging frame, and work held therein, relative to the cutter head. The cam is removable from the spindle, so that different forms or sizes of cams may be placed thereon for the different sizes, or forms of handles it is desired to shape. The chuck stock 14 is provided, in the upper portion, with an enlargement —34— having an annular chamber —33— adapted to receive a chuck head —28— that is retained therein by means of an inwardly projecting flange —35—, on one end and a ring —36— secured on the other end by suitable means such as screws —37—.

The chuck comprises a body or head —38— having a vertical longitudinal slot —39—, registering with a corresponding opening —40— in the top of the chamber 33, for the reception of the work. The body 38 is provided with longitudinal passages —41—, below the center thereof, adapted for the reception of cam-slides —42—, and with passages —43— above the center for the reception of cam-slides —44—. The body 38 is provided with a central, peripheral channel —45—, the purpose of which will hereafter be made apparent, it is further provided on both the periphery and end faces with anti friction means such as rollers —46—. A lower jaw —47—, positioned within a transverse recess —48—, the entrance to which is closed by a plug —49—, secured in place by means of a pin —50—, is provided with a notch, or depression, —51— adapted to conform approximately to the edge of an ax handle, and with inclined, cam, bearing faces —52—, adapted to be engaged by faces on the cam slides 42, and forced toward the center by movement of said slides. An upper jaw —55— positioned within a transverse recess —56— is provided with inclined faces —57— adapted to be engaged by faces 61, cam-slides 44 and with a tongue —58— adapted to enter slots 62 in the cam slides 44. The outer end of the jaw 55 is provided with the female portion —59— of a dovetail engaging connection, this connection is adapted to lie within the channel peripheral 45 when the jaw is entirely within the chuck head. The cam slides 42 and 44 have opposed inclined bearing faces —60—61— that are adapted to bear respectively on the inclined faces 52 and 57 of the jaws 47 and 55 and advance them toward the center of the chuck, clamping any work that may lie between them. The slides 44 are provided with inclined slots —62— adapted to receive a tongue 58, on the jaw 55, that serves to hold the jaw in proper relationship to the slide throughout its movement. The rear portions of the slides 42 and 44 are provided with longitudinal slots —63— wherein move vertical cam-plates —65—, that travel between vertical guides —66— integral with the head 38, and are held in position, and guided therebetween by means of pins extending through holes —67— in the guides, and slots —68— in the cam-plates. The rear portion of the cam-slides 42 and 44 are provided with resilient members —70—. As illustrated these consist of practically circular flat springs secured on the lower side of the slide and curving up and over the end of the slide into position within the slots 63 to be engaged by the cam surfaces —71— on the plates 65. Pins passed through holes —72—, in the sides of the slides 42 and 44, are so positioned as to be engaged by the inner cam faces —73— on the plates 65, for the purpose of returning the slides 42 and 44 to their normal position on the upward movement of the plates 65.

The cam-plates 65 are connected at their lower ends, by suitable means, to a block —75—, traction on which serves to pull the cam plates down, and reversely to push them up. The block is provided on its lower side with the female portion —76— of a dovetail connection. When the block is at its lowest point of travel it is engaged by a dog or latch —74—, pivoted on the chuck head, that catches on a ledge —77— thereon and retains it in that position. A pin —78— arranged horizontally within the block, and normally held retracted by a spring —79—, is adapted to impinge upon the dog and disengage it from the ledge 77 and allow the block to be raised. The inner end of the pin 78 is beveled adapting it to be engaged by a similarly beveled vertical pin —79— and projected outward against the dog 74. The female portion 76 is of such dimensions that the male member 81 has sufficient play therein to strike, and raise the pin 79, thus extruding the pin 78 and disengaging the dog, before exerting upward pressure on the block. A vertical slide —80— has on its upper end the male portion —81— of a dovetail connection adapted to be engaged with the female part 76 on the block 75. The slide 80 extends downward through a slot in the shaft 11 to a connection with a lever —82— fulcrumed in a slot —83— in the shaft 11, and that extends forward parallel with said shaft. A steady rest —84— is secured in the upper end of a vertical slide —85— associated with the head stock 13 that extends down, through a slot in the shaft 11, to a connection with the lever 82, and is raised and lowered thereby. A pair of parallel arms —86— and —87— pivotally secured on the main frame extend out therefrom into position to allow suitable means, such as a lug —88— on end of arm 86 to be interposed in the path of the handle 29 and retain it in the position it occupies when in a normal inoperative position; a rod —89— connecting the arms 86—87 extends downward into connection with the lever 82 and is raised and lowered by the movement thereof to interpose and remove the lug 88 from the path of the handle 29. A tractive lever —90— fulcrumed at —91— within a lateral slot —92—, in the depending portion of the chuck stock, is provided with a projection —93—, lying in the path of and adapted to be engaged by the lever 82 on the completion of its upward travel. The lever 82 strikes the projection 93 so close to the fulcrum 91 that a very small movement produces a long travel of the upper end of arm 90. As the arm 90 moves out from the chuck stock, a depending arm —94— moves in the opposite direction across the longitudinal slot —95—, through which the lever 82 passes, to allow of this movement the arm 94 is provided with a recess —96— for the reception of 82.

Figure 1:
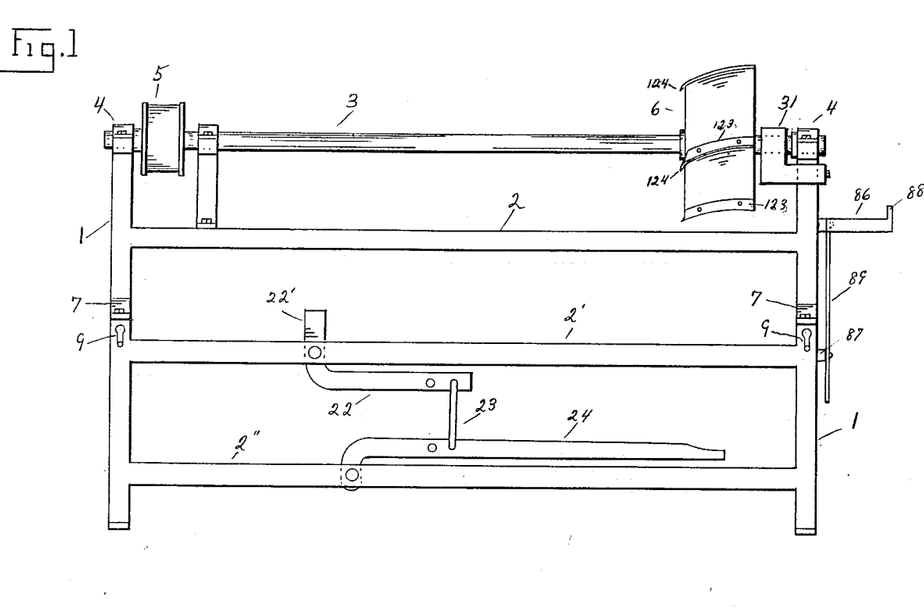
Figure 1, is a front elevation, with the swinging frame removed, for the sake of clearness.
Figure 2:
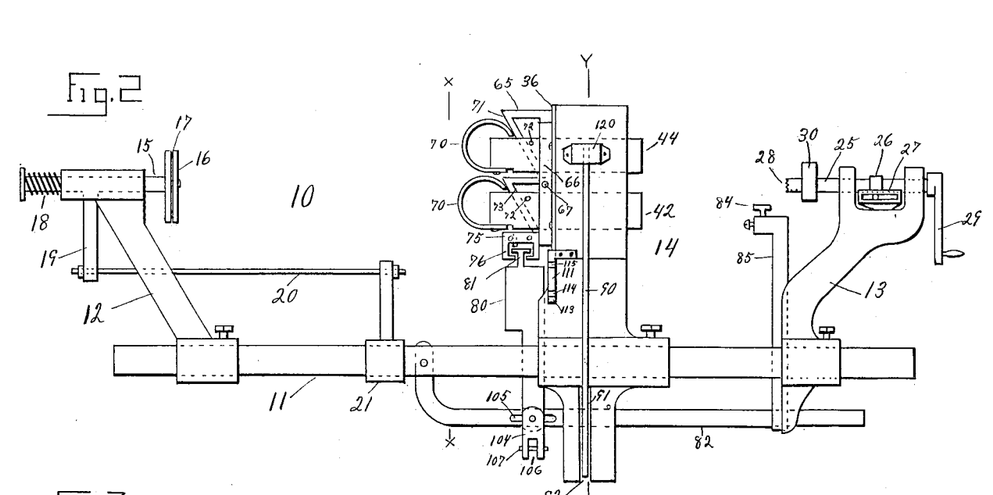
Fig. 2, a front elevation of the swinging frame, the operating lever being omitted for the sake of clearness.
Figure 3:
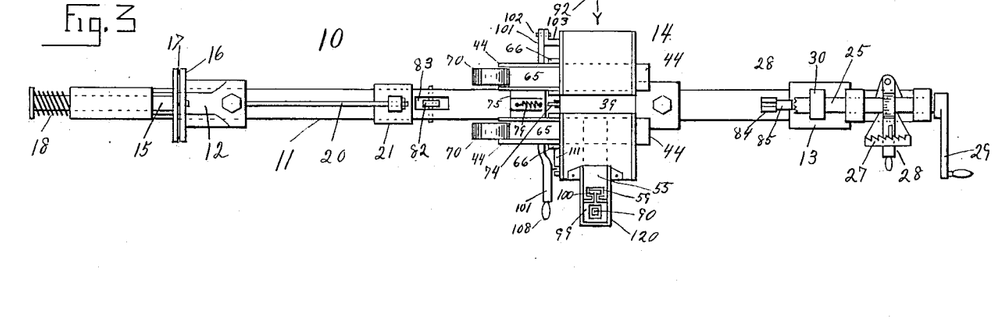
Fig. 3, a plan view of the swinging frame.
Figure 4:
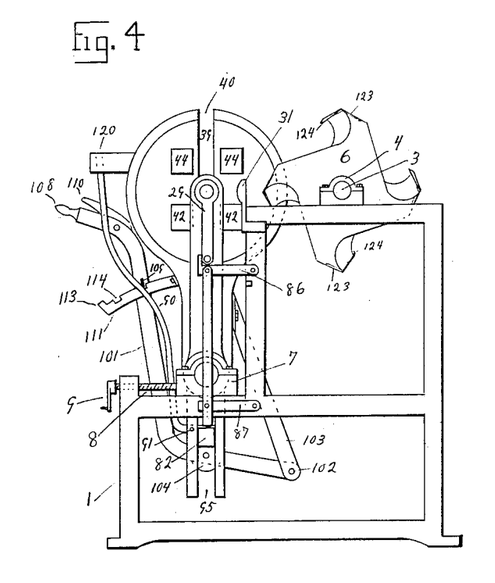
Fig. 4, an end elevation.
Figure 5:
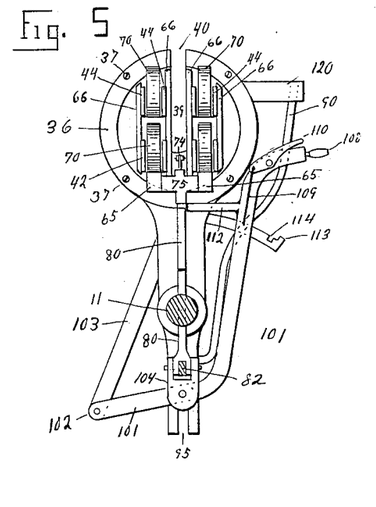
Fig. 5, an elevation of the rear end of the chuck carrying frame, looking forward from the line x—x on Fig. 2.
Figure 6:
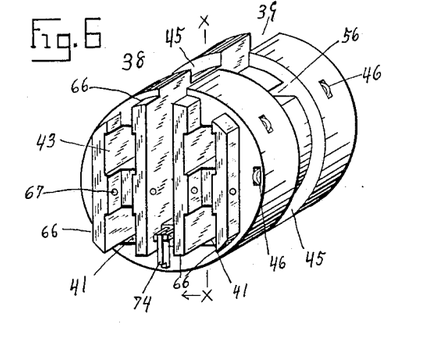
Fig. 6, a perspective of the chuck head.
Figure 7:
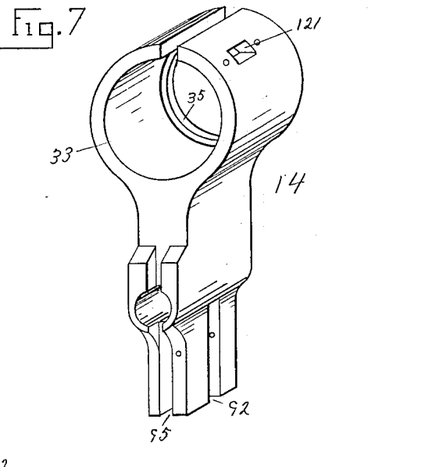
Fig. 7, a perspective of the chuck-stock.
Figure 8:
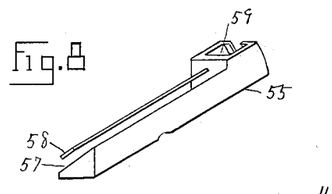
Figs. 8 and 9 perspectives, respectively, of the upper and lower chuck jaws.
Figure 9:
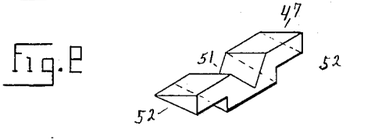
Figure 10:
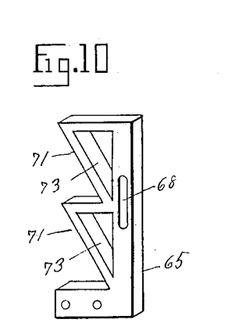
Fig. 10, a perspective of one of the vertical cam-plates.
Figure 11:
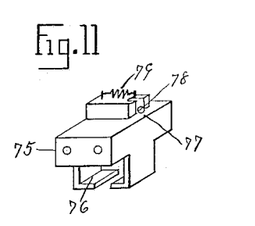
Fig. 11, a perspective of the block connecting the cam plates.
Figure 12:
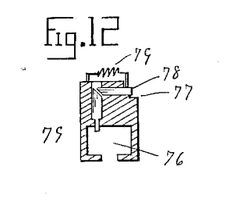
Fig. 12, a vertical, central, longitudinal section of Fig. 11.
Figure 13:
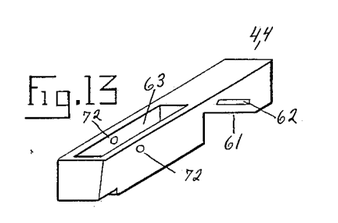
Figs. 13 and 14, perspectives respectively of the upper and lower cam-slides.
Figure 14:
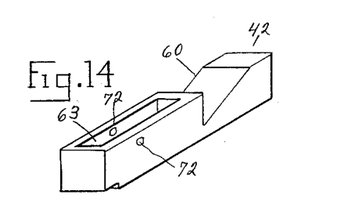
Figure 15:
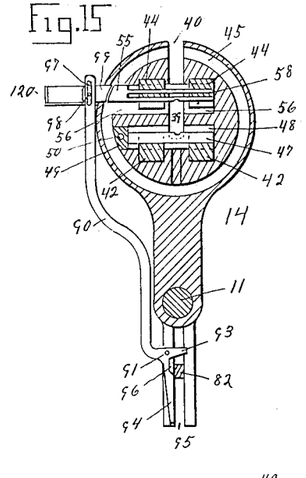
Fig. 15, a vertical section, on line y—y of Fig. 2.
Figure 16:
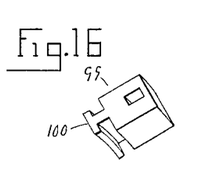
Fig. 16, a perspective of the tractor that connects with the upper chuck jaw.
Figure 17:
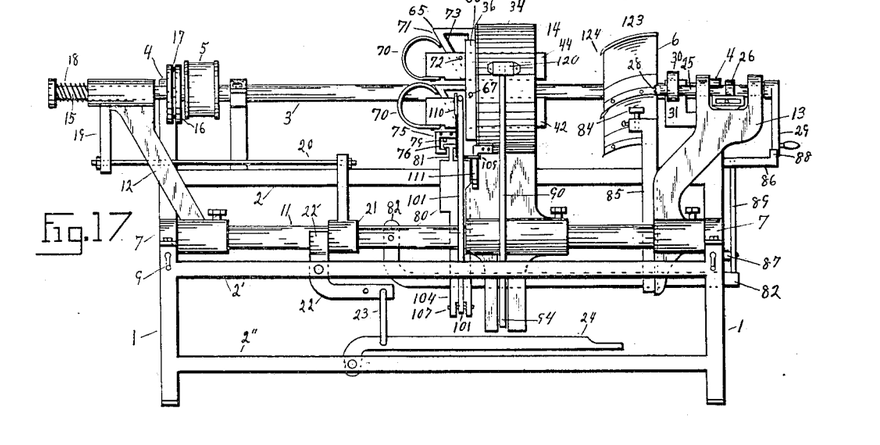
Fig. 17, is a front elevation, and Fig. 18 a rear elevation of the machine assembled complete.
Figure 18:
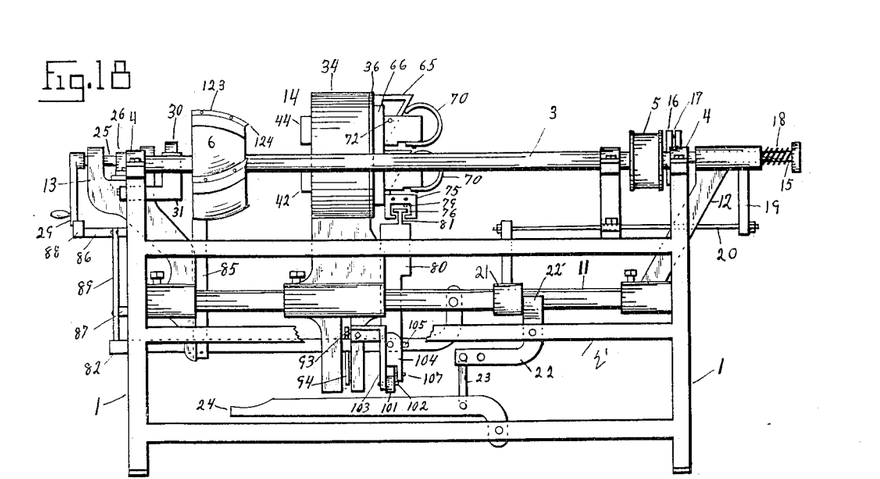
Figure 19:
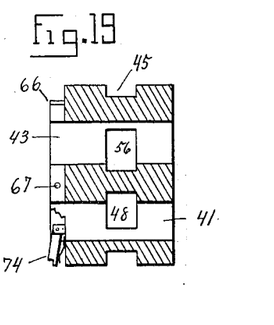
Fig. 19, a vertical, longitudinal section on line x—x of Fig. 6.
Figure 20:
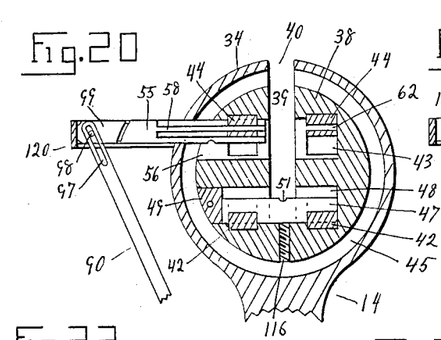
Figs. 20 and 21, views similar to Fig. 15 showing the parts in different positions.
Figure 21:
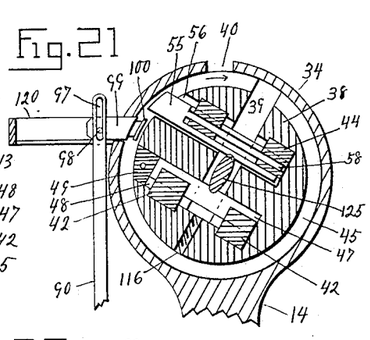

When the chuck is in its operative position the inner side of the arm 94 lies flush with the side of the slot 95 and bears against the side of the lever 82 during its travel up and down, locking the arm 90 against movement during said travel. The arm 90 is provided at its upper end with a slot —97— adapted to embrace a pin —98— in a tractor member —99— that is provided on its inner end with a male part —100— of a dovetail connection. The tractor 99 is adapted to be moved to and fro on guideways —120—, by the arm 90, and when at its inner limit to extend through an opening —121— in the wall of the annular chamber 33 and place the male part, 100, of the connection in position in the annular channel 45 to be engaged by the female part, 59 on the jaw 55 (as shown in Figs. 15 and 21).

It will be observed that the connection between the male and female parts takes place within the circumference of the chuck, and that they may freely engage, and disengage as the chuck is rotated. Inspection of Fig. 15 shows that the entrance to the chuck is obstructed by the jaw 55, and that work can not be removed, or inserted, while it is in that position, it will however be observed that when the lever 82 strikes the projection 93, tractive lever 90 will move out, from the chuck stock, carrying with it the tractor 99 and jaw 55 thus clearing the entrance to the chuck. A main operating lever —101— is fulcrumed at —102— on an arm —103— secured to and extending from the chuck stock. The vertical slide 80 is bifurcated at its lower end and embraces the lever 82. A connecting member —104— provided on its upper end with a bifurcation that embraces the lower end of the slide 80 and is connected therewith by means of a pin that passes through a slot —105—, in the lever 82, has on its lower end a bifurcation 106 embracing the lever 101 and is connected therewith by means of a pin 107; through the medium of this connection the slide 80 and lever 82 are operated simultaneously by the lever 101. The lever 101 is carried upward to a point where it may be readily grasped by the hand, and is provided with a handle —108—, and a latch —109—, operated by a thumb lever —110—, adapted to engage with notches in a quadrant —111—. A projection —112— extending inward from the lever 101 is adapted to abut against the slide 80 at its point of connection with the block 75, limiting the inward travel of the lever and also serving as a stop for the chuck head, because of the block 75 striking against it. The outward travel of the lever 101 is limited by the latch 109 coming into contact with a projection —113— on the quadrant, and is locked in its outer position by the latch engaging in the notch —114— and in its inner position by the latch entering a notch —115—.

Figure 22:
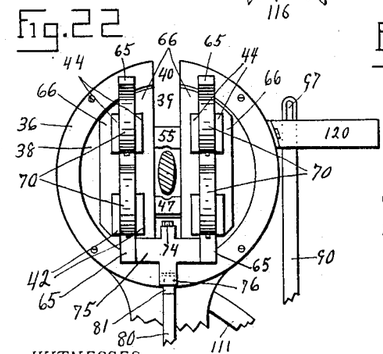
Figs. 22, and 23, elevations similar to Fig. 5, showing the parts in different positions.
Figure 23:
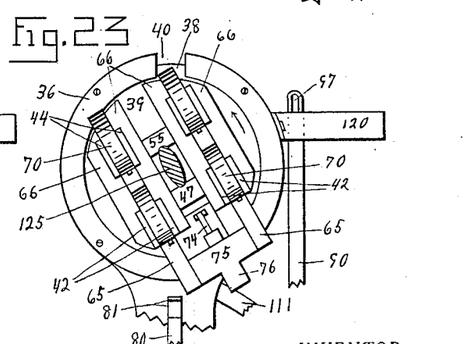

Figs. 3, 4, 5 and 20 show the parts in position, ready for the reception, or removal of work. Fig. 15, shows the jaw 55 in position across the slot 39; Fig. 22, shows work in position within the chuck, the jaws not clamped thereon; Figs. 21 and 23, show the jaws closed on the work, and the chuck partly rotated.

It is thought that the operation of the machine may now be understood. An ax handle is placed within the chuck with its pod resting on the rest 84, the end close against the spurs 28 on the spindle 25. The tail stock is then adjusted so that the face plate 16 will be in close proximity to the end of the handle, this adjustment has only to be made when changing to a different style of handle, as adjustment for slight variation in the length may be made by shifting the head spindle, by means of the lever 26. The foot lever 24 is then depressed advancing the tail spindle and forcing the handle onto the spurs 28. The handle of the main operating lever is then grasped in with the left hand, the latch 109 released from the notch 115, and the lever drawn forward, this starts the lever 82 down, the first effect being that the lever 90 is thrown forward, by the action of 82 leaving the recess 96 (Fig. 15), this carries the upper chuck jaw into place. Continued movement of the main lever draws down the slide 80 and with it cam-plates 65, as the cam-plates descend the contact surfaces 71 bear against the springs 70 and draw the cam-slides 42 and 44 out of the chuck head 38 thereby forcing the jaws 47 and 55 against the ax handle within the chuck. When the jaws encounter the resistance of the work they can move no farther, nor can the cam slides, but the springs 70 yield and permit the cam-plates to complete their downward movement, at which point the dog 76 engages with the block and retains the parts in that position. As the lever 82 descends it draws the slide 85 down, lowering the rest 84 out of the way. The lowering of lever 82 permits the detent 88 on the end of arm 86 to fall away from the handle 29, leaving it free. The outward movement of the main lever is limited by the latch 109 contacting with the projection 112, on the quadrant 111, the latch is then allowed to drop in the notch 114, this locks the main lever in position and it may be utilized to swing the frame over to bring the work against the cutter head, and the cam 30 against the plate 31. The handle 29 is then grasped with the right hand and the work rotated thereby, presenting all sides to the action of the cutter head, the cam regulating the cut.

It will be observed that the work is rigidly and truly held, within the chuck, that the chuck rotates freely within the chuck stock, and that the female parts 59 and 76 of the dovetail connections escape freely from the male parts. When the pod has been properly shaped the frame is drawn back from the cutter head, by means of the main lever, the latch raised from the notch 114 and the lever returned to its initial position, the movements previously described occurring in reverse order. As the lever 82 reaches the upper limit of its movement it strikes the projection 93 of lever 90 thus withdrawing the jaw 55 from the chuck and permitting the work to be removed.

In shaping the pods of straight handles it is necessary that they should be held centrally within the chuck regardless of variations in size, so I make use of two chuck jaws as described, with other shapes, where it is desired that the work be held eccentrically within the chuck I may take out the lower jaw 47, and cam-slides 42, holding the work between the upper jaw 55 and an adjustable, screw threaded, stop —116—.

Having thus described my invention so that any one skilled in the art pertaining thereto may make and use the same. I claim:—

1. In an ax handle lathe, a cutter head in combination with work-holding means comprising head and tail spindles and a chuck positioned intermediate the same, said chuck consisting of a chuck-casing and a rotative head therein, a longitudinal slot in said casing and head for the passage and reception of work, transverse jaws within said head, actuating means associated with the head for closing said jaws on the work, and manipulative means exterior of the head from which said actuating means disengages when the head is rotated.

2. In an ax handle lathe, a cutter head, head and tail spindles and a chuck comprising a casing, a rotative head therein, said casing and head having slots for the passage and reception of work, upper and lower transverse jaws within said head and extending across said slots, and manipulative means exterior of the chuck with which the upper jaw engages and by which it may be withdrawn from across the slot when the chuck is in position to receive work.

3. In an ax handle lathe, a chuck comprising a chuck casing and a rotative chuck-body therein, longitudinal slots in said casing and chuck-body for the passage and reception of work, a work retaining member arranged in said body across said slot, manipulative means exterior of said chuck for withdrawing said member from across said slot to permit the entrance of work, said member engaging with said manipulative means only when the chuck is in position to receive work.

4. In an ax handle lathe, a chuck comprising a casing and a rotative body therein, said body provided with a slot for the reception of work, a work-retaining member arranged within said body across said slot, means associated with said body for actuating said retaining member to clamp the work in place, manipulative means exterior of the chuck adapted to engage with said actuating means when the chuck is in a normally inoperative position.

5. In an ax handle lathe, a chuck, a rotative head mounted therein said head having a slot for the reception of work, a retaining-member arranged within said body across said slot, means associated with said head for actuating said member to clamp work in place, said member adapted to be withdrawn from across said slot to permit of the introduction or removal of work, and manipulative means exterior of the chuck adapted to automatically engage with said actuating means, and said work-retaining member when the chuck is in a normal inoperative position.

6. In an ax handle lathe, a chuck comprising a rotatable head having a longitudinal slot for the reception of work, a transverse jaw within the head and crossing said slot, said jaw adapted to be withdrawn from across said slot, means associated with the head for actuating said jaw to clamp work in position, manipulative means exterior of the chuck adapted to engage automatically with said jaw actuating means and with said jaw, when the chuck is in a normally inoperative position, and operate them in sequence.

7. In an ax handle lathe, a chuck, a rotatable head having a longitudinal slot for the reception of work, a transverse work-retaining member, longitudinal cam-slides adapted to engage said member to cause it to clamp work in position, vertical members positioned on the end of said head and adapted to engage and shift said cam-slides, a manipulative lever connected with said vertical members and adapted to be automatically disconnected therefrom on the rotation of the head.

8. In an ax handle lathe, a chuck a rotatable head mounted therein having a longitudinal slot for the reception of work, a transverse work-retaining member, longitudinal cam-slides within said head and extending therefrom, said slides adapted to shift said work-retaining member, vertical members positioned on the end of the head and adapted to engage and shift said cam-slides, means for locking said vertical members at the lower limit of their travel, a manipulative lever connected with said vertical members and adapted to be disconnected therefrom on the rotation of the head.

9. An ax handle lathe comprising a fixed frame, a frame mounted to swing thereon, a cutter head mounted to rotate on the fixed frame, centering spindles on the swinging frame, a chuck for holding the work carried on the swinging frame intermediate said spindles, said chuck consisting of a rotatable head having a slot for the reception of work, jaws extending across said slot, actuating means for said jaws associated with the head, said means and one of said jaws adapted to be automatically engaged with manipulative means exterior of the head.

10. In an ax handle lathe, a chuck, a rotatable head therein having a longitudinal slot for the reception of work, transverse work-retaining members therein, longitudinal cam-slides within said head and extending therefrom, said cam-slides adapted to engage and shift said members, vertical members positioned on the end of the head and adapted to engage said cam-slides, yielding connections between the vertical members and the cam-slides permitting the vertical members to complete their travel after the cam-slides have been checked by the work-retaining members contacting with the work.

11. In an ax handle lathe, a chuck-body, a rotatable head therein having a longitudinal slot for the reception of work, a transverse work-retaining member within the head, longitudinal cam-slides in engagement with the work-retaining member and extending therefrom, vertical members positioned on the end of the head, yielding connections between the vertical members and the cam-slides, and means for locking said members during the rotation of the head.

12. In an ax handle machine, a chuck-stock, a rotatable head therein having a longitudinal slot for the reception of work, a transverse jaw within the head and above the center thereof, an adjustable stop extending into the lower portion of the slot, longitudinal cam-slides in engagement with the jaw, said slides extending from the end of the head, vertical members positioned on one end of the head, yielding connections between said vertical members and the cam-slides, manipulating means associated with the chuck-stock and detachably connected with said vertical members, and a latch for retaining the vertical members in an operated position during the rotation of the head.

13. In an ax handle lathe, a chuck-stock, a rotatable head therein having a longitudinal slot, a transverse jaw within the head, an adjustable stop extending within the lower portion of said slot, cam-slides in engagement with said jaw and extending beyond the end of the head, vertical members positioned on the end of the head, yielding connections between said vertical members and the cam-slides, a latch on the head for retaining the vertical members at the lower limit of their travel, a vertical slide on the chuck-stock detachably engaged with said vertical members, and a manipulative lever operatively connected with said vertical slide.

14. In an ax handle lathe, a chuck-stock, a rotatable head therein having a longitudinal slot, a transverse jaw within the head, an adjustable stop extending within the slot, cam-slides in engagement with said jaw, said slides extending from the end of the head, vertical members positioned on an end of the head, yielding connections between said vertical members and said cam-slides, a latch on the head for retaining the vertical members at the lower limit of their travel, a vertical slide on the chuck stock in detachable engagement with said vertical members, a manipulative lever on the chuck stock operatively connected with said vertical slide, and means whereby said vertical slide releases said latch on its upward travel.

15. In an ax handle lathe, a chuck stock, a rotatable head therein having a longitudinal slot, an adjustable stop extending therein, a jaw within the head and extending across said slot, means for actuating said jaw to clamp work between it and said stop, the chuck stock having an opening through the wall thereof in alinement with said jaw, a tractor adapted to be extended through said opening and detachably connected with said jaw for the purpose of withdrawing the same from across said slot, a manipulative lever, and operative connections between said lever and said tractor.

16. In an ax handle lathe, a chuck stock, a rotatable head therein having a longitudinal slot for the reception of work, an adjustable stop extending within the lower portion of the slot, a jaw within the head extending across the slot, means for actuating the jaw to clamp work between it and said stop, the chuck stock being provided with an opening through the wall thereof in alinement with the jaw when the jaw is in a normal inoperative position, a guideway secured on the stock in alinement with said opening, a tractor adapted to travel in the guideway, said tractor extending through said opening and being in detachable engagement with said jaw when the jaw is in normal inoperative position, a tractive lever in operative connection with said tractor, a manipulative lever and operative connections between said levers.

17. In an ax handle lathe, a chuck stock, a rotatable head therein having a longitudinal slot for the reception of work, an adjustable stop extending within the slot, a transverse jaw extending across said slot, cam-slides in engagement with the jaw, said slides extending beyond the head, vertical members positioned on the end of the head, yielding connections between said vertical members and said cam-slides, a latch on the head for retaining the vertical members in an operated position, a vertical slide on the chuck stock in detachable engagement with said vertical members, a guideway attached to said chuck body and in alinement with an opening provided through said body, said guide way being in alinement with said jaw when the same is in a normal inoperative position, a tractor adapted to travel in said guideway, said tractor extending through said opening into position to be detachably engaged with said jaw when the same is in its normal inoperative position, a tractive lever in operative connection with said tractor, a manipulative lever, and operative connections between said manipulative lever and the vertical slide and the tractive lever.

18. In an ax handle lathe, a chuck stock, a head mounted for rotation therein and having a work-receiving chamber, an interiorly located work-retaining member extending across said chamber, interiorly located actuating members therefor, exteriorly located actuating members a resilient element positioned between said actuating members, and manipulative means adapted to be connected with said exterior actuating means at a predetermined point in the rotation of said head.

19. In an ax handle lathe, a chuck-stock, a head mounted for rotation therein and having a work-receiving chamber, work-retaining members and actuating means therefor interiorly located in said head, said retaining members extending across said chamber and one thereof being adapted to be retracted from thereacross, actuating means exteriorly located on said head, resilient elements disposed between said exterior and interior actuating members, manipulative means adapted to be connected with said exterior actuating members and with one of said work retaining members at predetermined points in the rotation of said head.

20. A chuck-stock, a head mounted for rotation therein and having a work-chamber, a transverse jaw within the head above the center thereof, a transverse jaw below the center thereof, longitudinal cam-slides in engagement with said jaws, said slides extending from an end of the head, vertical members positioned on the end of the head, yielding connections between said vertical members and the slides, manipulative means associated with the chuck-stock and engageable with said vertical members, and a latch for holding said members in an operated position during the rotation of the head.

21. A chuck-stock, a head mounted for rotation therein having a longitudinal slot, transverse jaws within the head, cam-slides in engagement with said jaws and extending beyond the head, vertical members positioned on the end of the head, yielding connections between the vertical members and the cam-slides, means on the head for holding the vertical members at the lower limit of their travel, a vertical slide on the chuck stock engageable with said vertical members, and a manipulative lever operatively connected with said slide.

22. A chuck-stock, a head mounted for rotation therein having a longitudinal slot, transverse jaws within the head, cam-slides in engagement with said jaws and extending from the head, vertical members positioned on an end of the head, yielding connections between the vertical members and the cam slides, a latch on the head, a vertical slide on the chuck-stock engageable with said vertical members, a manipulative lever operatively connected with said vertical slide, and means whereby said vertical slide operates said latch.

23. A chuck-stock, a head, having a work receiving chamber, mounted for rotation therein, upper and lower jaws within the head and extending across said chamber, means for actuating said jaws to clamp work therebetween, the chuck-stock having an opening through the wall thereof in alinement with said upper jaw, a tractor adapted to be inserted through said opening into position to be engaged with said upper jaw for the purpose of withdrawing same from across said chamber, a manipulative lever, and operative connections between said lever and said tractor.

24. A chuck-stock, a head mounted for rotation therein and having a work-receiving chamber, jaws within the head and extending across the chamber, means for actuating said jaws to clamp work therebetween, the chuck-stock having an opening through the wall thereof in alinement with the upper of said jaws, a guide secured on the stock in alinement with said opening, a tractor adapted to travel on said guide and be inserted through said opening into position to be detachably engaged with the upper of said jaws when said jaw is normally inoperative, a tractive lever in operative connection with said tractor, a manipulative lever and operative connections between said levers.

25. A chuck-stock, a head mounted for rotation therein and having a work-receiving chamber, transverse jaws extending across said chamber, cam-slides in engagement with said jaws, said slides extending beyond the head vertical members positioned on an end of the head, yielding connections between said members and said slides, a latch on the head for retaining the members in an operative position, a vertical slide on the chuck-stock engageable with the vertical members, a guide on the chuck-stock in alinement with an opening provided therethrough, said guide being in alinement with the upper of said jaws when same is in normal inoperative position, a tractor adapted to travel on said guide and be inserted through said opening into position to be engaged by said upper jaw as it assumes a normal inoperative position, a tractive lever in operative connection with said tractor, a manipulative lever and operative connections between said manipulative lever said vertical slide and said tractive lever.

26. A chuck-stock, a head mounted for rotation therein and having a work-receiving chamber, interiorly located work-retaining members, extending across said chamber, interiorly positioned actuating members therefor, exteriorly positioned actuating members, resilient elements positioned between said interior and exterior actuating members, manipulative means adapted to be engaged by said exterior actuating members at a predetermined point in the rotation of the head.

27. A chuck-stock, a head mounted for rotation therein and having a work-receiving chamber, transverse jaws within the head and extending across the chamber, cam-slides in engagement with said jaws and adapted to operate the same to clamp work therebetween, said slides projecting beyond the end of the head and having slots in their outer ends, vertical members positioned on the end of the head and extending through said slots, resilient members attached to said cam-slides in position to be engaged by said vertical members, a latch on the head adapted to engage the vertical members and retain them at the lower range of their movement during the rotation of the head, a guide on the chuck-stock in alinement with an opening provided therethrough, a tractor adapted to travel on said guide and be inserted through said opening into position to be engaged by the upper of said jaws as it assumes a normal inoperative position, a manipulative lever and operative connections between the same and said vertical members and said tractor.

LORENZO JOHNSON.

Witnesses:
 OSCAR HOWENSTEIN,
 W. B. MUNNELL.

---

Copies of this patent may be obtained for five cents each, by addressing the "Commissioner of Patents, Washington, D. C."